US012208824B2

(12) United States Patent
Waldo

(10) Patent No.: US 12,208,824 B2
(45) Date of Patent: Jan. 28, 2025

(54) OPERATING MECHANISM FOR RAIL CAR DOOR

(71) Applicant: Trinity North American Freight Car, Inc., Dallas, TX (US)

(72) Inventor: Adam James Waldo, Westville, IN (US)

(73) Assignee: TRINITY NORTH AMERICAN FREIGHT CAR, INC., Dallas, TX (US)

( * ) Notice: Subject to any disclaimer, the term of this patent is extended or adjusted under 35 U.S.C. 154(b) by 657 days.

(21) Appl. No.: 17/293,077

(22) PCT Filed: Dec. 13, 2019

(86) PCT No.: PCT/US2019/066312
§ 371 (c)(1),
(2) Date: May 12, 2021

(87) PCT Pub. No.: WO2020/123995
PCT Pub. Date: Jun. 18, 2020

(65) Prior Publication Data

US 2021/0394802 A1 Dec. 23, 2021

Related U.S. Application Data

(60) Provisional application No. 62/780,214, filed on Dec. 15, 2018.

(51) Int. Cl.
*B61D 19/00* (2006.01)
*E05D 15/10* (2006.01)
*E05F 11/54* (2006.01)

(52) U.S. Cl.
CPC ....... *B61D 19/009* (2013.01); *E05D 15/1007* (2013.01); *E05F 11/54* (2013.01);
(Continued)

(58) Field of Classification Search
CPC .............. B61D 19/009; E05D 15/1007; E05D 15/1002
(Continued)

(56) References Cited

U.S. PATENT DOCUMENTS 3,126,067 A * 3/1964 Bailey ..................... E21B 10/16 175/379
3,179,984 A * 4/1965 Bailey ...................... B60J 5/062 49/276

(Continued)

OTHER PUBLICATIONS

PCT International Preliminary Report on Patentability issued for International application No. PCT/US2019/066312—Jun. 24, 2021.

(Continued)

*Primary Examiner* — Gregory J Strimbu
(74) *Attorney, Agent, or Firm* — Baker Botts L.L.P.

(57) ABSTRACT

An operating mechanism for plug-type rail car doors includes first and second links connected to rotatable first and second support bars. The links include respective elongated slots partially overlapping with one another, wherein each slot receives a respective cam. The cams are rotatable together about a rotational axis which is eccentrically arranged relative to both cams. An actuating lever is connected to the cams to enable an operator to rotate the cams about the rotational axis. The actuating lever is movable such that the first and second links are retracted relative to one another to simultaneously rotate the first and second support bars, and such that the first and second links are extended relative to one another to simultaneously counter-rotate the first and second support bars. A gear train may be provided between the actuating lever and the cams to reduce the necessary manual operating torque.

18 Claims, 10 Drawing Sheets

(52) U.S. Cl.
CPC ..... *E05Y 2201/618* (2013.01); *E05Y 2201/68* (2013.01); *E05Y 2201/712* (2013.01); *E05Y 2900/51* (2013.01)

(58) Field of Classification Search
USPC .................................... 49/209, 210, 211, 216
See application file for complete search history.

(56) References Cited

U.S. PATENT DOCUMENTS

| | | | | | |
|---|---|---|---|---|---|
| 3,386,205 | A | | 6/1968 | Herr | |
| 3,613,312 | A | * | 10/1971 | Wolak et al. ....... | E05D 15/1007 49/130 |
| 3,660,938 | A | * | 5/1972 | Ross, Jr. ............. | E05D 15/1007 49/220 |
| 3,750,335 | A | | 8/1973 | Marsh | |
| 3,913,267 | A | * | 10/1975 | Knippel .............. | E05D 15/1007 49/281 |
| 4,020,594 | A | * | 5/1977 | Ceyer ................. | E05D 15/1007 49/395 |
| 6,546,611 | B1 | * | 4/2003 | Ryan ...................... | E05B 83/10 292/336.3 |
| 6,637,347 | B1 | * | 10/2003 | Richard .................. | E05B 83/02 105/378 |
| 2003/0000416 | A1 | | 1/2003 | Nottingham | |
| 2011/0174025 | A1 | * | 7/2011 | Rasmussen ......... | E05B 47/0673 70/91 |

OTHER PUBLICATIONS

PCT International Search Report issued for International application No. PCT/US2019/066312—Feb. 5, 2020.
PCT Written Opinion of the International Searching Authority issued for International application No. PCT/US2019/066312—Feb. 5, 2020.
Canada Patent Office, Official Action in CA Application No. 3,123,394, dated Mar. 21, 2024.

* cited by examiner

OPERATING MECHANISM FOR RAIL CAR DOOR

PRIORITY

This nonprovisional application is a U.S. National Stage Filing under 35 U.S.C. § 371of International Patent Application Ser. No. PCT/US2019/066312 filed Dec. 13, 2019and entitled “Operating Mechanism for Rail Car Door” which claims priority to U.S. Provisional Patent Application No. 62/780,214 filed Dec. 15, 2018 both of which are hereby incorporated by reference in their entirety.

FIELD OF THE INVENTION

The present invention relates to rail car doors.

BACKGROUND OF THE INVENTION

Typical plug-type rail car doors are mounted on the side of a railway car and include a series of panels reinforced by horizontally disposed channels at the top, bottom and intermediate levels of the door. A pair of vertical support bars are configured to support the door on the rail car. Opposite ends of the support bars may be coupled to upper and lower cranks which serve as lever arms for moving the door laterally into and out of an opening defined in the rail car. Upon actuation of an operating mechanism, such as a manually operated gear assembly, the support bars are rotated causing corresponding rotation of the upper and lower cranks. Rotation of the cranks displaces the door laterally from the door opening until the door is supported on a horizontal track extending along a side of the rail car. The door is moveably supported on the track by roller assemblies which enable the door to slide longitudinally along the side of the rail car. FIG. 1 illustrates a prior art rail car door as described above.

FIG. 1 includes roller assemblies 101, upper cranks 103, support bars 105, operating mechanism 107, gear segment 109, lever 111, pinion gear 113, lower cranks 115, and track 117.

AAR Standard S-213 imposes requirements on operating mechanisms for rotating the support bars to cause lateral displacement of the door. The door must open, close, roll smoothly, and be operable by one person without the use of mechanical devices to aid and assist operating the door. The operating mechanism must have an “anti-spin” design so as not to allow the unintentional spinning of the operating lever as a result of forces (e.g. gasket compression forces) applied to the door from opening or closing it, or from a load applied to the inside face of the door. The operating lever must not unintentionally spin with a load up to 30,000 lb applied to the inside of the door. The operating mechanism must also have an “anti-drift” design to prevent the door from drifting laterally into the car side while the door is in the fully open position and from moving on the door tracks. The operating mechanism must be engaged to prevent laterally inward movement of door as a result of external force and/or torsion springs on the support bars (such as with insulated plug doors). The door must not move laterally inward toward the car with a load up to 2,000 lb applied to the outside face of the door. With regard to strength, the operating mechanism must withstand a torque of not less than 750 ft-lb. The operating lever torque required to open or close the door must not exceed 110 ft-lb, and must not exceed 58 ft-lb through more than ¼ turn of the operating lever rotation during closing.

Known operating mechanisms for rotating the support bars to cause lateral displacement of the door are mechanically complex. A known operating mechanism includes a pinion gear coupled to a manual operating lever mounted on the door, an operating gear segment meshing with the pinion gear, and a pair of linkages each connected to the operating gear and a respective one of the support bars. The operating lever is rotatable by a user to drive the gears to rotate the support bars. The operating mechanism may include a two-way brake or retarder assembly associated with the operating gear segment to provide anti-spin and anti-drift functionality. A ratchet and pawl mechanism may also be installed in the operating mechanism to achieve anti-spin and anti-drift functionality. A locking rod assembly separate from the operating mechanism may be provided to selectively lock and unlock the door for lateral movement away from the rail car.

Known rail car operating mechanisms have many moving parts subject to wear, and are heavy. They are also expensive to manufacture, install, and maintain in good working order. From the user’s standpoint, known rail car operating mechanisms are tedious to operate because they typically require about four full rotations of the operating lever to achieve lateral door displacement.

SUMMARY OF THE INVENTION

The present disclosure provides an operating mechanism for plug-type rail car doors that is more economical to manufacture and install and is less susceptible to wear than currently known operating mechanisms, yet also provides anti-spin and anti-drift functionality. Like currently known operating mechanisms, the disclosed operating mechanism is usable by an operator to simultaneously rotate first and second support bars of a rail car door about their respective longitudinal axes to laterally displace the rail car door relative to the side of the rail car, and thus the operating mechanism may be installed as a retrofit to existing rail cars in the field. The disclosed operating mechanism may also be provided in newly fabricated rail cars.

The operating mechanism of the present disclosure may generally comprise a first torque lever attached to the first support bar and a second torque lever attached to the second support bar, and a first link connected to the first support bar by way of the first torque lever and a second link connected to the second support bar by way of the second torque lever. The first link may include a first elongated slot and the second link may include a second elongated slot at least partially overlapping with first elongated slot. The operating mechanism may further comprise a first cam received by the first elongated slot and a second cam received by the second elongated slot, the first cam and the second cam being rotatable as a unit about a rotational axis, wherein the rotational axis is eccentrically arranged relative to the first and second cams. The operating mechanism may additionally comprise an actuating lever operably connected to the first and second cams and manually movable by an operator to rotate the first and second cams about the rotational axis. The actuating lever may be movable such that the first link and the second link are retracted relative to one another to simultaneously rotate the first and second support bars in opposite rotational directions about their respective longitudinal axes, and may be movable such that the first link and the second link are extended relative to one another to simultaneously counter-rotate the first and second support bars in opposite rotational directions about their respective longitudinal axes.

The operating mechanism may include a first connecting rod pivotally coupled at one end thereof to the first torque lever and pivotally coupled at another end thereof to the first link, and a second connecting rod pivotally coupled at one end thereof to the second torque lever and pivotally coupled at another end thereof to the second link.

In one embodiment, the operating mechanism may comprise an actuating shaft connected to the actuating lever and fixed to the first and second cams, wherein the actuating shaft has a central axis coinciding with the rotational axis, wherein the actuating shaft is rotatable about the rotational axis to a retraction rotational position whereby the first link and the second link are retracted relative to one another, and is rotatable about the rotational axis to an extension rotational position whereby the first link and the second link are extended relative to one another.

In another embodiment, the operating mechanism may comprise a gear train, wherein the actuating lever is connected to the first and second cams by way of the gear train. The gear train may be configured to provide a mechanical advantage to reduce an operating torque needed by the operator to move the actuating lever.

BRIEF DESCRIPTION OF THE DRAWINGS

The nature and mode of operation of the present invention will now be more fully described in the following detailed description of the invention taken with the accompanying drawings figures, in which.

DETAILED DESCRIPTION OF THE INVENTION

Figure 1:
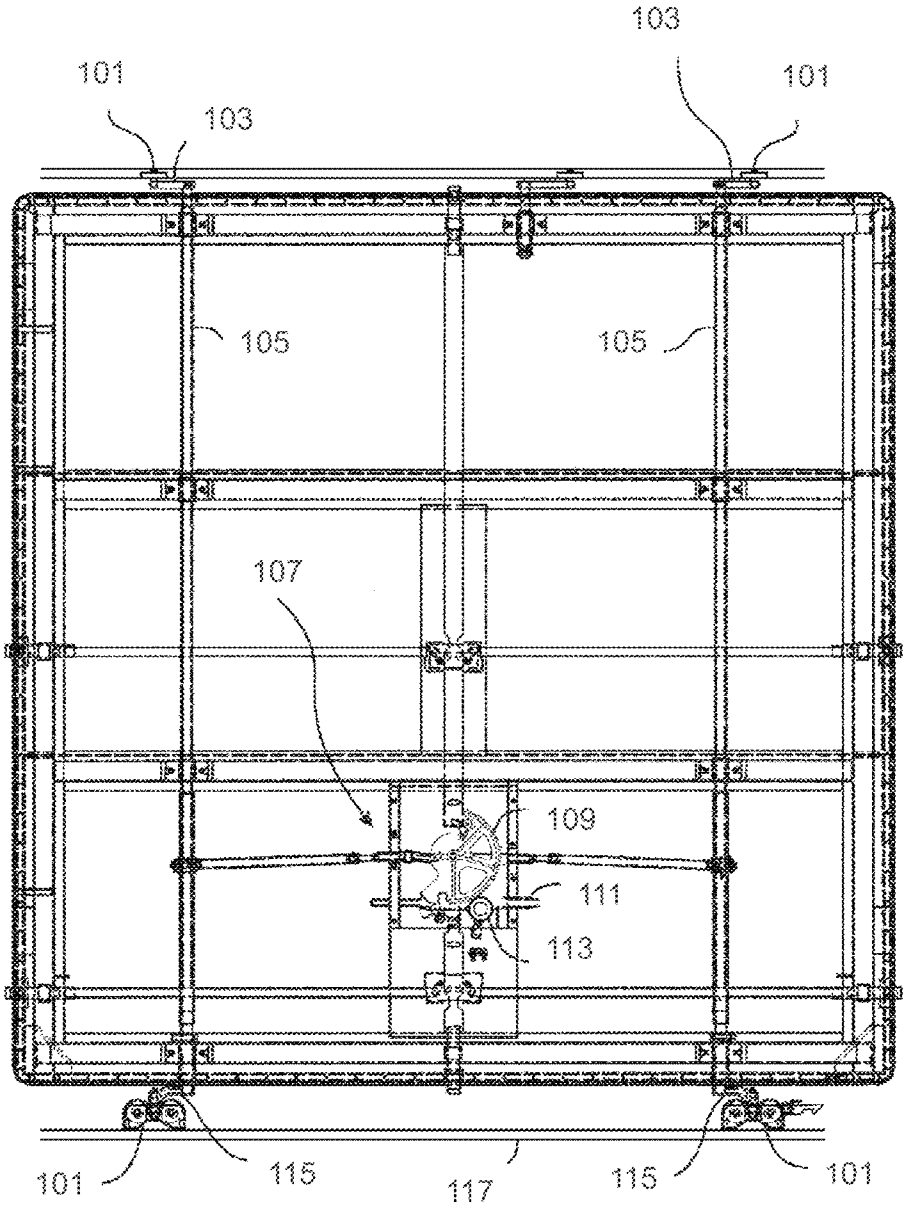
PRIOR ART Fig. 1
FIG. 1 is front elevational view of a plug-type rail car door having an operating mechanism according to know prior art.
Figure 2:
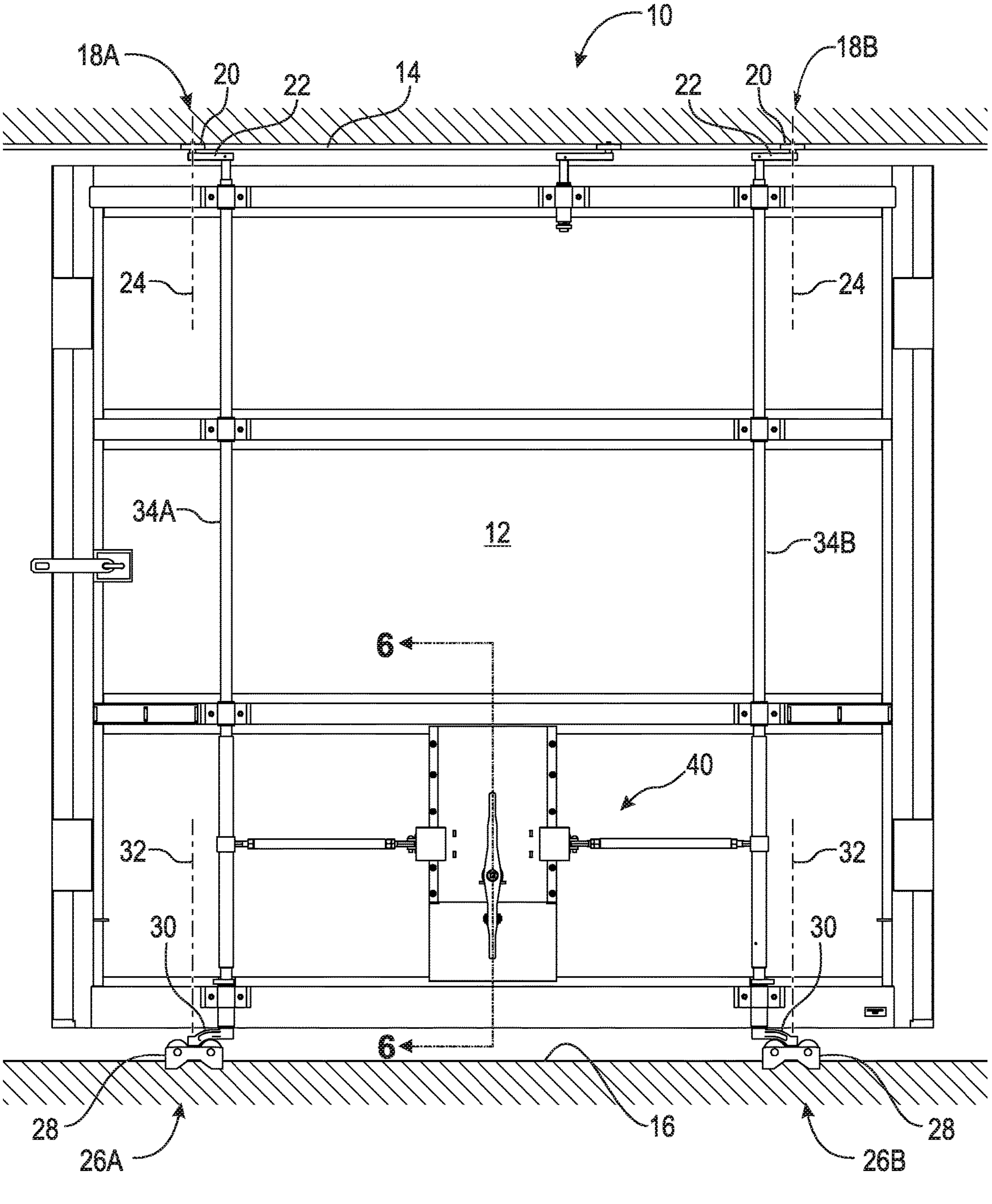
FIG. 2 is front elevational view of a plug-type rail car door having an operating mechanism according to a first embodiment of the present disclosure.
Figure 3:
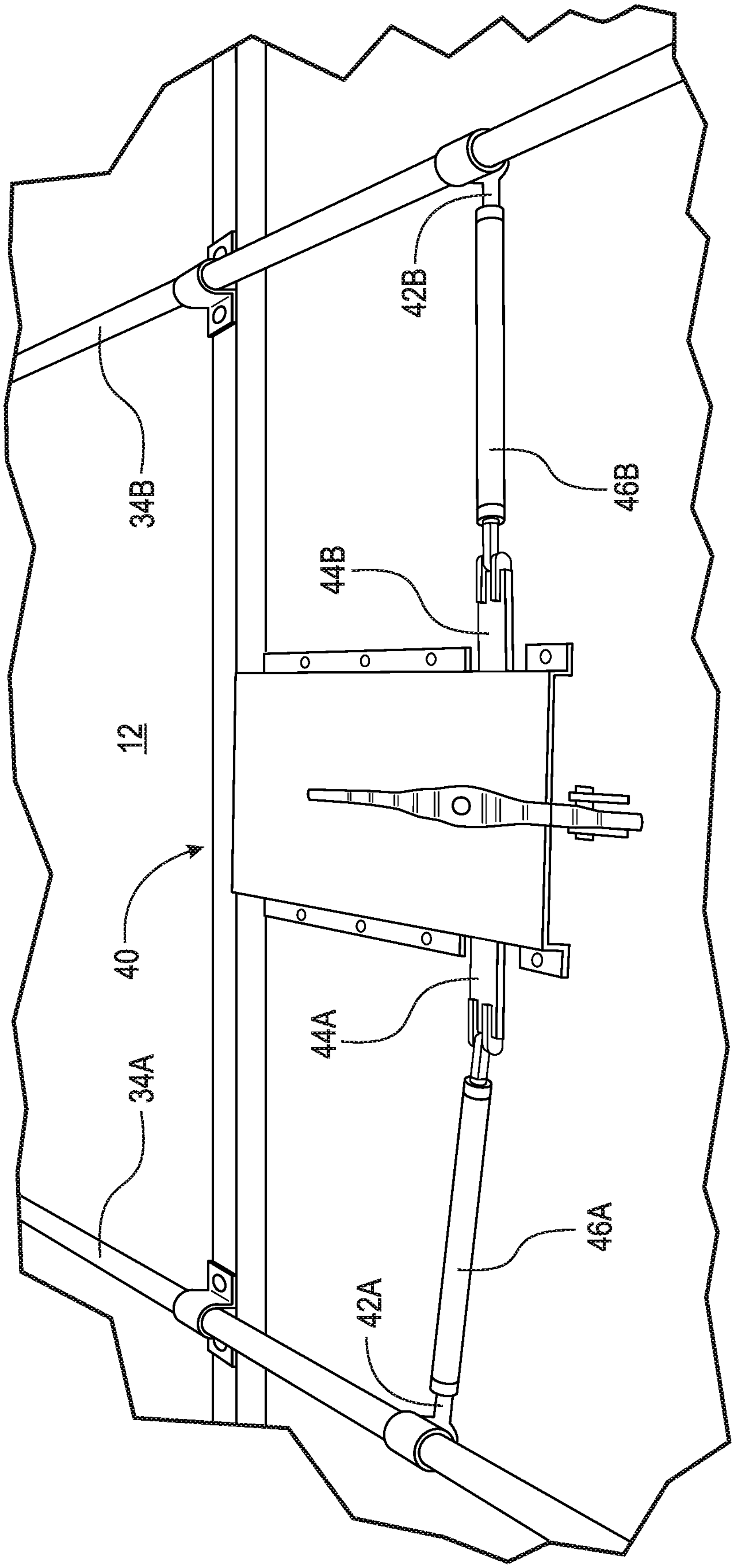
FIG. 3 is a perspective view of the rail car door shown in FIG. 2.
Figure 4A:
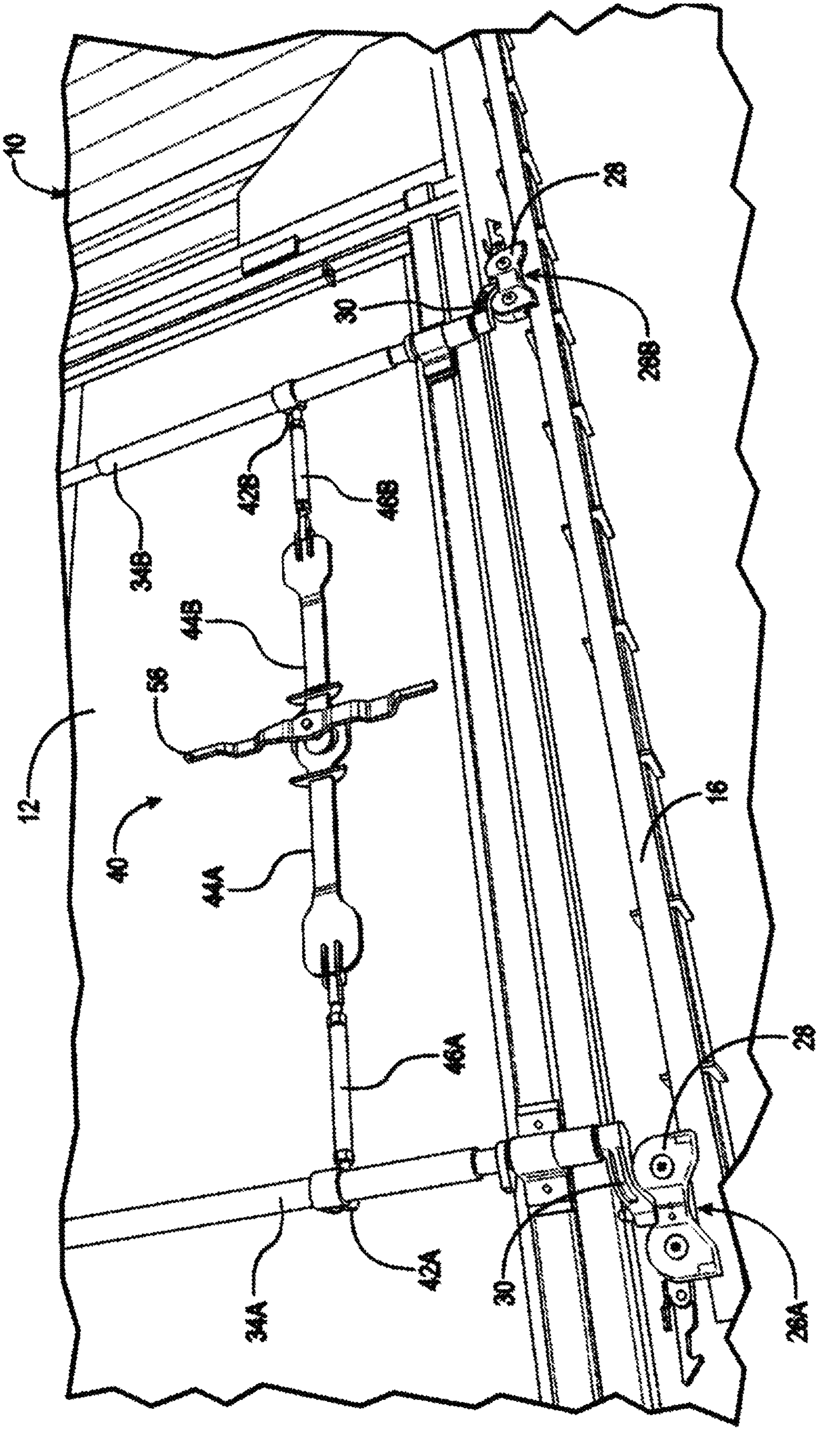
FIG. 4A is a schematic view of the rail car door shown in FIG. 2, with a bearing cover plate of the door being removed to show details of the operating mechanism, wherein the operating mechanism is in a closed position thereof.
Figure 4B:
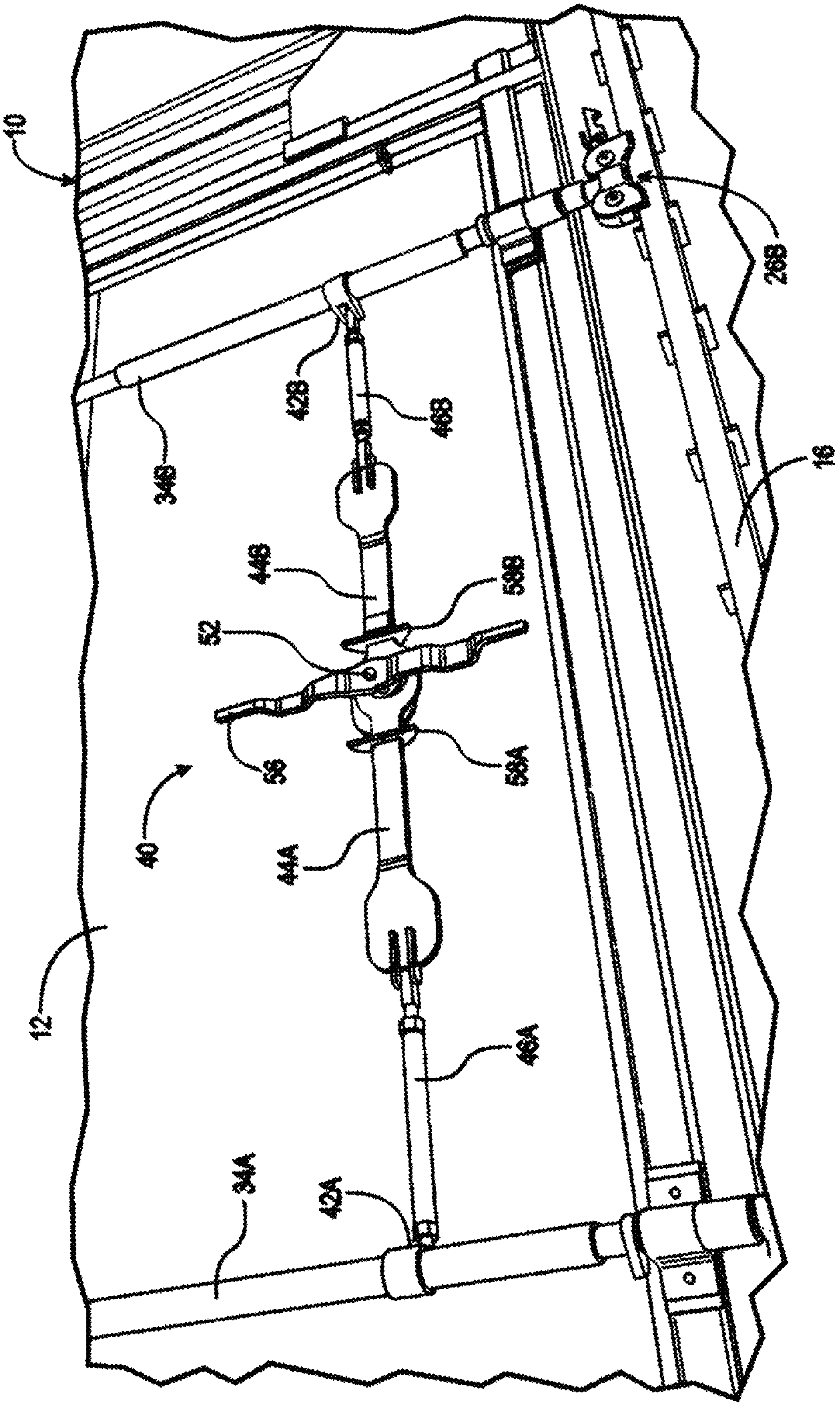
FIG. 4B is a schematic view similar to that of FIG. 4A, wherein the operating mechanism is in an open position thereof.

FIGS. 2, 3, 4A and 4B show a substantially planar rail car door 12 for installation on a door bay of a rail car 10, for example a boxcar. Rail car 10 may comprise an upper rail 14 extending in a longitudinal direction of rail car 10, and a lower rail 16 extending parallel to upper rail 14, i.e. in a longitudinal direction of the rail car. Together, upper rail 14 and lower rail 16 provide a track along which door 12 may travel relative to the door bay of rail car 10.

Rail car 10 also comprises a first upper roller assembly 18A and a second upper roller assembly 18B. Each of the first and second upper roller assemblies 18A, 18B has at least one upper roller 20 engaging upper rail 14 for rolling travel along upper rail 14, and an upper crank 22 pivotally coupled to the at least one upper roller 20 to pivot relative to the at least one upper roller 20 about a corresponding pivot axis 24 extending in a vertical direction of rail car 10.

Rail car 10 further comprises a first lower roller assembly 26A and a second lower roller assembly 26B. Each of the first and second lower roller assemblies 26A, 26B has at least one lower roller 28 engaging the lower rail 16 for rolling travel along lower rail 16, and a lower crank 30 pivotally coupled to the at least one lower roller 28 to pivot relative to the at least one lower roller about a corresponding pivot axis 32 extending in the vertical direction of rail car 10.

Rail car 10 comprises a first support bar 34A and a second support bar 34B. Door 12 is mounted to first and second support bars 34A, 34B. First support bar 34A has one end fixed to upper crank 22 of first upper roller assembly 18A and another end fixed to lower crank 30 of first lower roller assembly 26A. Second support bar 34B has one end fixed to upper crank 22 of second upper roller assembly 18B and another end fixed to lower crank 30 of second lower roller assembly 26B.

For opening and closing rail car door 12 (i.e. displacing the door laterally away from the side of the rail car to an open position and laterally toward the side of the rail car to a closed position), rail car 10 comprises an operating mechanism 40. Operating mechanism 40 is operable by a user to simultaneously rotate first support bar 34A and second support bar 34B in opposite rotational directions such that door 12 is displaced in a lateral direction of rail car 10.

Reference is also made to FIGS. 5A-5C and FIG. 6 showing a portion of operating mechanism 40 in greater detail. Operating mechanism 40 may comprise a first torque lever 42A attached to first support bar 34A, a second torque lever 42B attached to second support bar 34B, a first link 44A connected to first support bar 34A by way of first torque lever 42A, and a second link 44B connected to second support bar 34B by way of second torque lever 42B. For example, operating mechanism 40 may include a first connecting rod 46A pivotally coupled at one end thereof to first torque lever 42A and pivotally coupled at another end thereof to first link 44A, and a second connecting rod 46B pivotally coupled at one end thereof to second torque lever 42B and pivotally coupled at another end thereof to second link 44B. As may be seen, first link 44A includes a first elongated slot 48A, and second link 44B includes a second elongated slot 48B at least partially overlapping with first elongated slot 48A. Each of first and second links 44A, 44B may include a pair of clevis ears 45 fixed at a distal end of the link, wherein the clevis ears 45 provide a pair of axially aligned openings to facilitate pivotal connection of the link to an associated connecting rod 46A, 46B.

Operating mechanism 40 may also comprise a first cam 50A received by first elongated slot 48A, a second cam 50B received by second elongated slot 48B, and an actuating shaft 52 fixed to first cam 50A and to second cam 50B, wherein actuating shaft 52 has a rotational axis 54 eccentrically arranged relative to first cam 50A and second cam 50B (i.e., rotational axis 54 intersects first cam 50A and second cam 50B at respective locations not at a center of the corresponding cam). Cams 50A, 50B may be circular in shape.

Figure 5A:
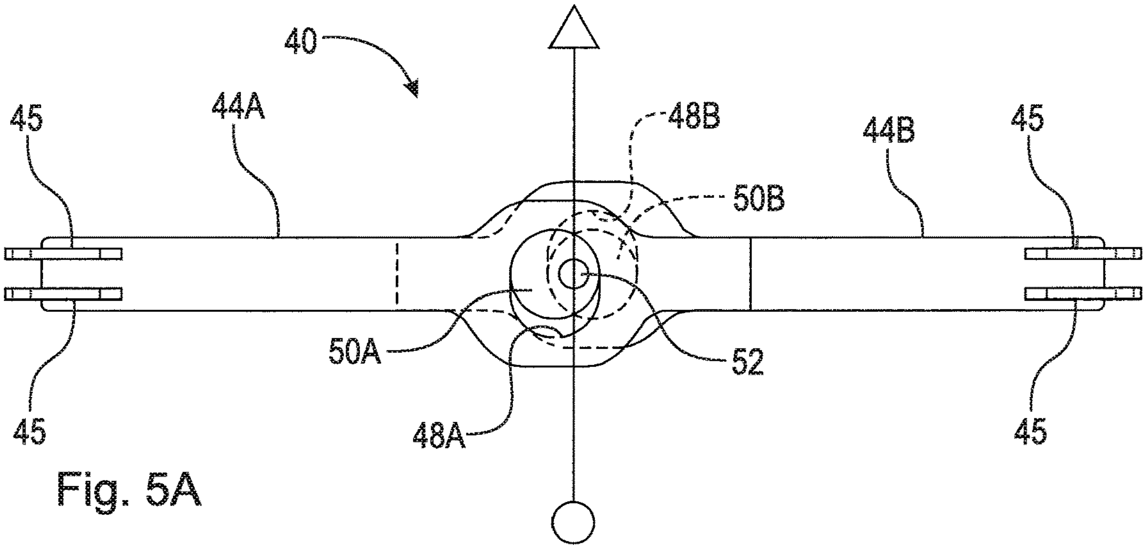
FIG. 5A illustrates the operating mechanism functioning as an actuating lever when the operating mechanism is rotated, wherein the first and second links are extended with respect to each other.
Figure 5B:
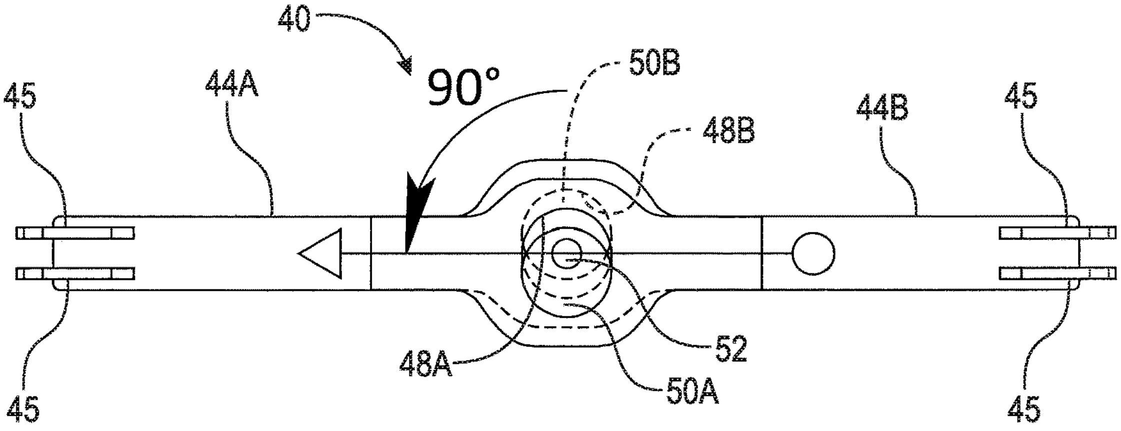
FIG. 5B illustrates the operating mechanism functioning as an actuating lever when the operating mechanism is rotated, wherein the first and second links are in an intermediate position.
Figure 5C:
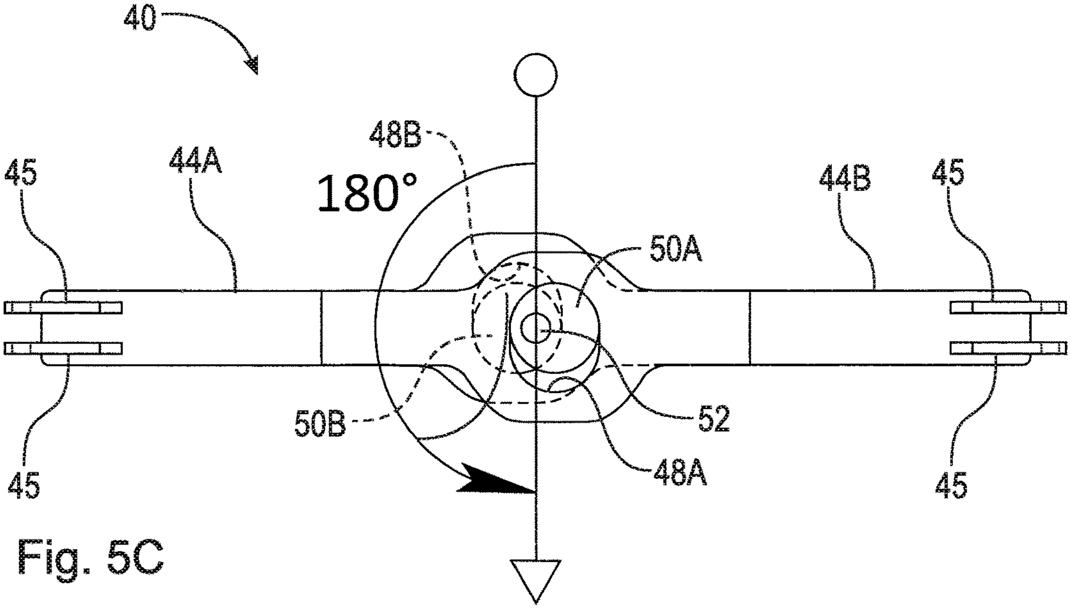
FIG. 5C illustrates the operating mechanism functioning as an actuating lever when the operating mechanism is rotated, wherein the first and second links are retracted with respect to each other.

As illustrated in FIGS. 5A-5C, actuating shaft 52 may be rotated about rotational axis 54 to a retraction rotational position (FIG. 5C) whereby first link 44A and second link 44B are retracted relative to one another to simultaneously rotate first support bar 34A and second support bar 34B in opposite rotational directions about their respective vertical axes. Operating mechanism 40 may comprise an actuating lever 56 fixedly attached to actuating shaft 52 to enable a user to apply torque to rotate the actuating shaft. Operating mechanism 40 may further comprise a first guide member 58A and a second guide member 58B arranged to slidably receive and guide movement of first link 44A and second link 44B, respectively. As will be understood, the resulting rotations of first and second support bars 34A, 34B due to retraction of links 44A, 44B will cause door 12 to be displaced in a first lateral direction relative to rail car 10.

Actuating shaft 52 may also be rotated about rotation axis 54 to an extension rotational position (FIG. 5A) whereby first link 44A and second link 44B are extended relative to one another to simultaneously counter-rotate first support bar 34A and second support bar 34B in opposite rotational directions about their respective vertical axes. As will be understood, the resulting counter-rotations of first and second support bars 34A, 34B due to extension of links 44A, 44B will cause door 12 to be displaced in a second lateral direction relative to rail car 10 opposite the first lateral direction mentioned above.

In the drawing figures, the first lateral direction is away from rail car 10 to open door 12, and the second lateral direction is toward rail car 10 to close door 12. Alternatively, operating mechanism 40 may be configured such that the first lateral direction is toward rail car 10 to close door 12, and the second lateral direction is away from rail car 10 to open door 12.

In the depicted embodiment, the retraction rotational position and the extension rotational position are 180 degrees apart, whereby rotation of actuating lever 56 by a user through one-half turn will efficiently open or close door 12. Moreover, the user may rotate actuating lever 56 in either rotational direction (i.e. clockwise or counter-clockwise), whichever direction is easiest for the user, to open or close door 12.

Links 44A, 44B, clevis ears 45, cams 50A, 50B, actuating shaft 52, actuating lever 56, and guide members 58A, 58B may be manufactured from steel or another suitably strong material. By way of non-limiting example, links 44A, 44B, clevis ears 45, cams 50A, 50B, and guide members 58A, 58B, may be manufactured from ⅜" thick steel plate, and actuating shaft 52 may be made from 1" diameter bar stock.

Figure 6:
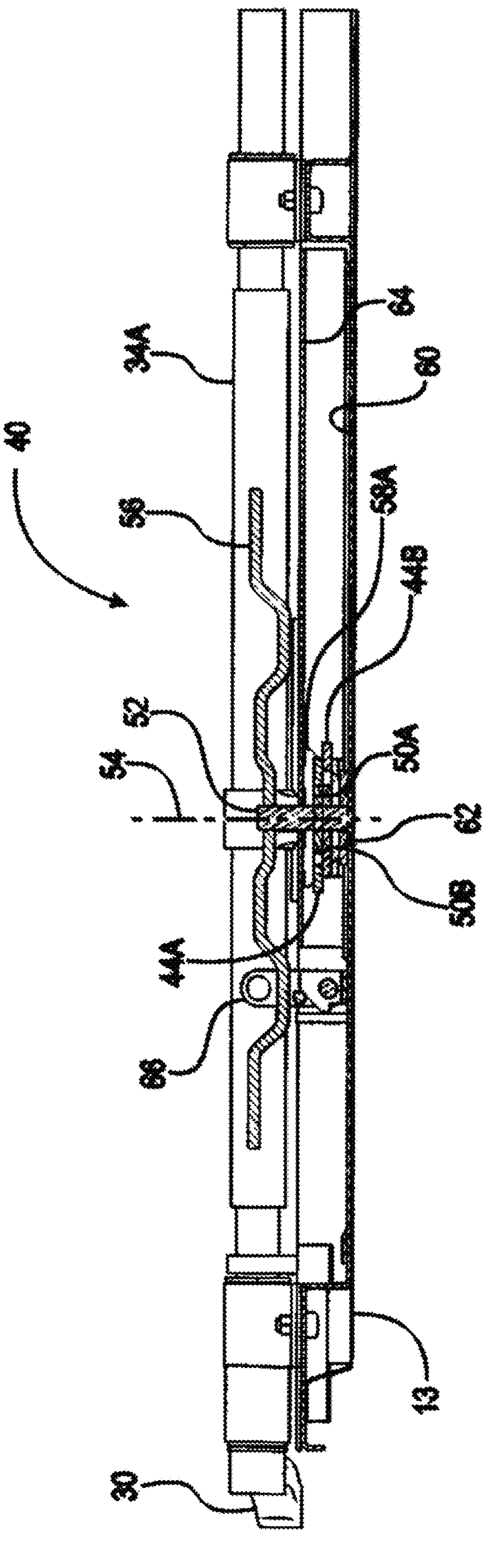
FIG. 6 is a cross-sectional view of the operating mechanism of the first embodiment taken generally along the line 6-6 in FIG. 2.

As best seen in FIG. 6, operating mechanism 40 may be mounted on door 12 by a bearing plate 60 fastened to a skin sheet 13 of door 12. A locator plate 62 having a recess for receiving an end of actuating shaft 52, and guide members 58A, 58B, may be fixed to bearing plate 60, for example by welding. A bearing cover plate 64 may be provided over bearing plate 60 to protect the operating mechanism. bearing cover plate 64 may include a hole through which actuating shaft 52 extends, wherein actuating lever 56 is fixed to a protruding portion of the actuating shaft. A seal cam 66 may be attached to bearing plate 60.

As will be appreciated, operating mechanism 40 provides anti-spin and anti-drift functionality with far fewer moving parts than known operating mechanisms, no gears, and no ratchet and pawl mechanisms. Moreover, operating mechanism 40 is less expensive to manufacture and is easier to install than known operating mechanisms.

Figure 7A:
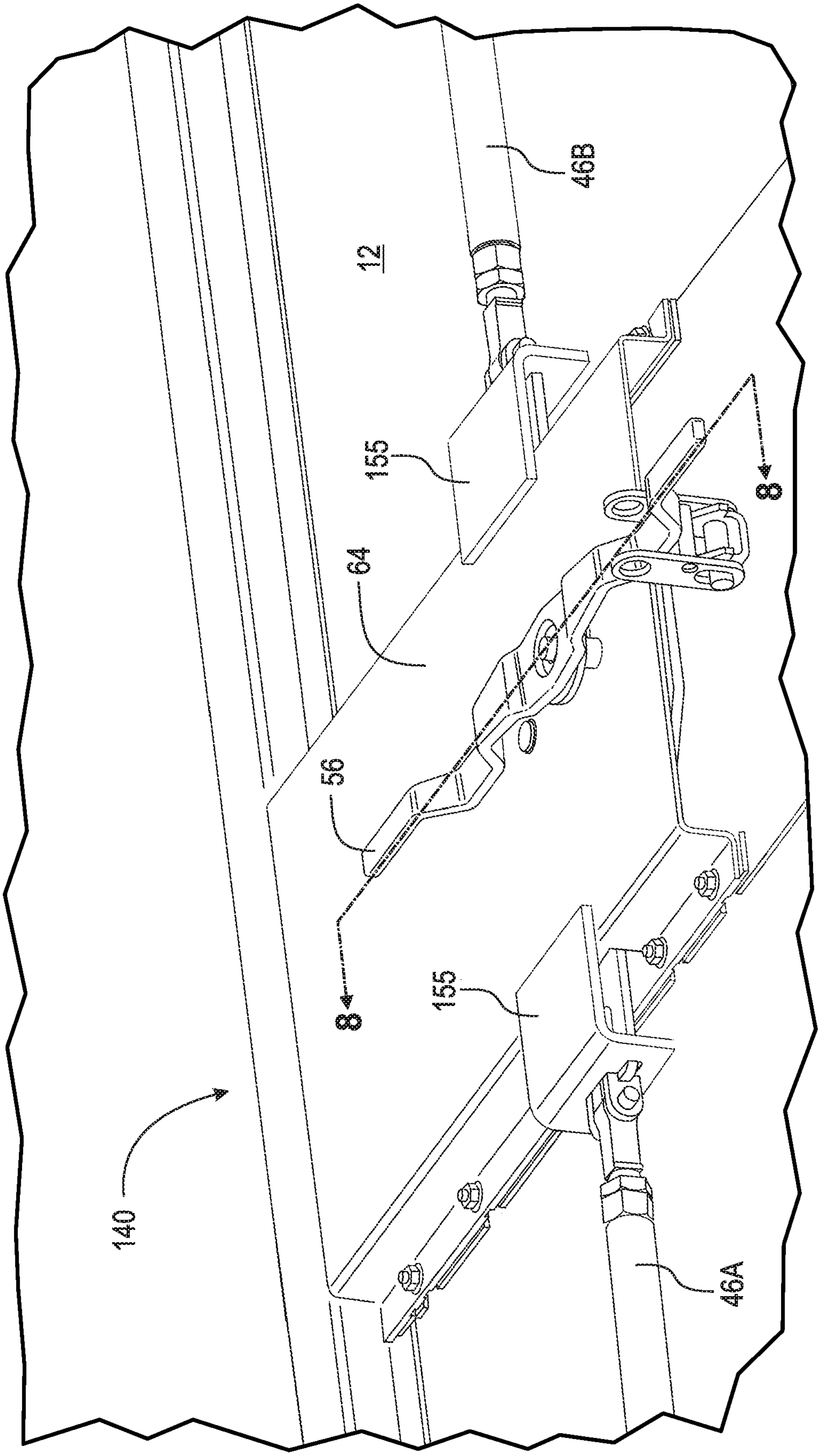
FIG. 7A is a perspective view of a rail car door operating mechanism formed in accordance with a second embodiment of the present disclosure.
Figure 7B:
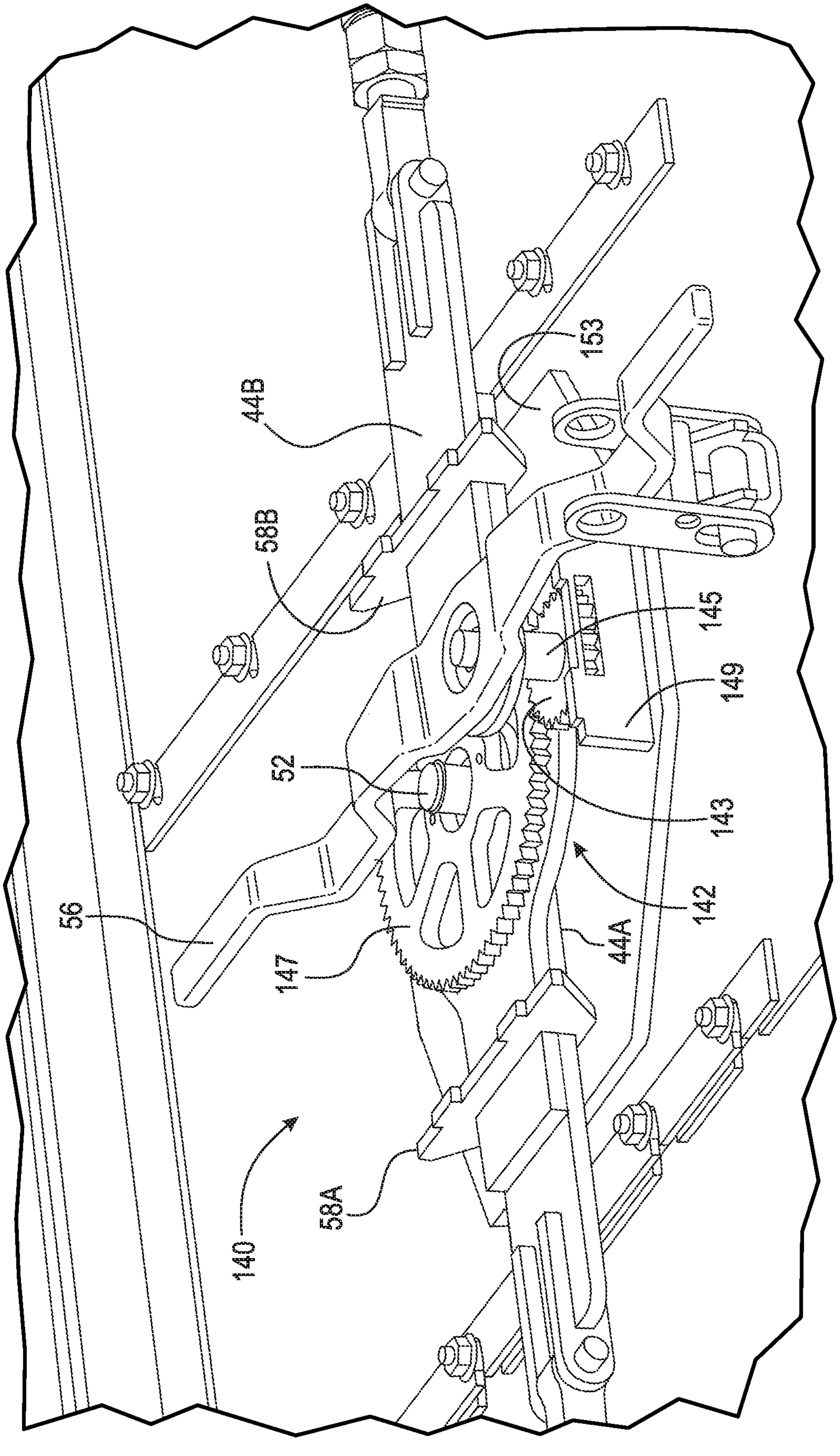
FIG. 7B is another perspective view of the operating mechanism shown in FIG. 7A, wherein a bearing cover plate of the door is removed to show details of the operating mechanism.
Figure 8:
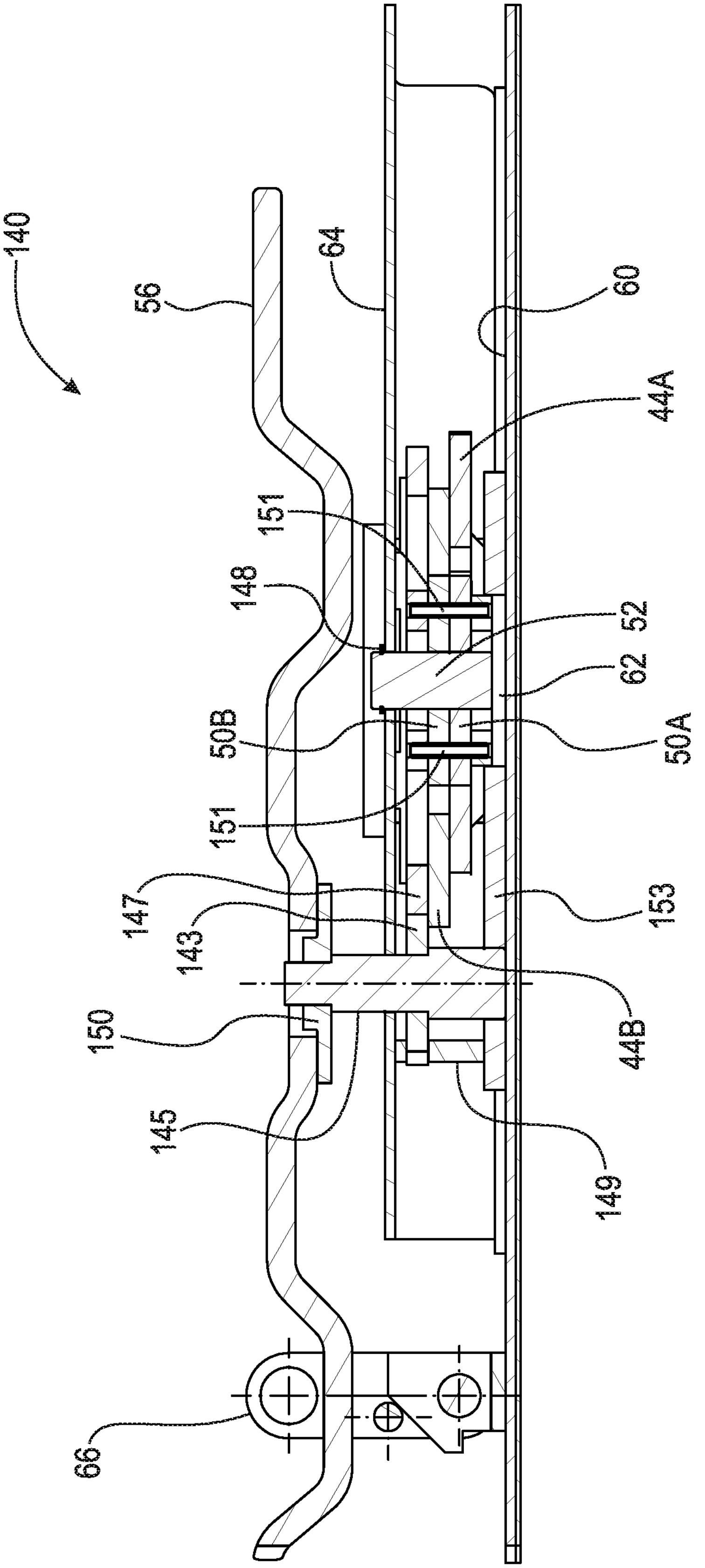
FIG. 8 is a cross-sectional view of the operating mechanism of the second embodiment taken generally along the line 8-8 in FIG. 7A.

FIGS. 7A, 7B, and 8 illustrate an operating mechanism 140 formed in accordance with another embodiment of the present disclosure for opening and closing rail car door 12. Similar to operating mechanism 40 of the previous embodiment, operating mechanism 140 is operable by a user to simultaneously rotate first support bar 34A and second support bar 34B in opposite rotational directions such that door 12 is displaced in a lateral direction of rail car 10. Unlike operating mechanism 40 of the previous embodiment, operating mechanism 140 includes a gear train 142 configured to reduce the force required to move the actuating lever 56 and thus make it easier for an operator to open and close rail car door 12.

In operating mechanism 140, actuating lever 56 is connected to first cam 50A and second cam 50B by way of gear train 142. Gear train 142 may include a drive gear 143 coupled to actuating lever 56 for rotation with the actuating lever, and a driven gear 147 meshed with drive gear 143 to rotate in response to rotation of drive gear 143. First cam 50A and second cam 50B may be coupled to driven gear 147 by a pair of dowel or spring pins 151 such that as driven gear 147 rotates about the central axis of shaft 52, first cam 50A and second cam 50B rotate with driven gear 147 about the central axis of shaft 52. Alternatively, or in addition, driven gear 147 may be attached directly to actuating shaft 52 for conveying rotational motion to first cam 50A and second cam 50B gear. Gears 143 and 147 may be spur gears, wherein the diameter of drive gear 143 is less than the diameter of driven gear 147 in order to provide a mechanical advantage. As may be understood, gear train 142 is configured to reduce an operating torque which must be applied by the operator to move actuating lever 56 to cause rotation of actuating shaft 52. In one implementation, a 3:1 gear ratio is provided to reduce the operating torque, however other gear ratios may be used.

As illustrated in the example embodiment shown in FIGS. 7A, 7B, and 8, drive gear 143 may be coupled to actuating lever 56 by a coaxial gear shaft 145 and an adapter 150 mounted on gear shaft 145 and fixed to actuating lever 56. A slotted guide element 149 may be arranged adjacent gear shaft 145 to receive a peripheral portion of drive gear 143 as the drive gear rotates about an axis defined by gear shaft 145. Driven gear 147 may be mounted coaxially on actuating shaft 52 over second cam 50B and first cam 50A. As may be understood by comparing FIG. 8 to FIG. 6, first link 44A and first cam 50A may be arranged either in front of or behind second link 44B and second cam 50B along the axis of actuating shaft 52. A mounting plate 153 may be attached to bearing plate 60 on door 12 for locating components of operating mechanism 140. An external retainer clip 148 may be provided near the outer end of actuating shaft 52 on the outside of bearing cover plate 64. A pair of reinforcement plates 155 may be fixed to bearing cover plate 64 to support and guide first link 44A and second link 44B.

From a manufacturing standpoint, it is advantageous that in both embodiments disclosed herein, first link 44A and second link 44B are identical, as are first cam 50A and second cam 50B, thereby making these components more economical to produce in high quantities. Moreover, first cam 50A and second cam 50B are circular in shape and therefore easy to machine.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the claims.

The invention claimed is:

1. A rail car door assembly comprising:

a rail car door;

a first support bar and a second support bar extending parallel to the first support bar, the first and second support bars each having a respective longitudinal axis, the rail car door being mounted to the first and second support bars, wherein the first and second support bars are rotatable relative to the rail car door about the respective longitudinal axes of the first and second support bars, and wherein rotation of the first and second support bars about the respective longitudinal axes displaces the rail car door between a closed position and an open position; and an operating mechanism usable by an operator to simultaneously rotate the first and second support bars about the respective longitudinal axes of the first and second support bars, wherein the operating mechanism includes:

a first torque lever attached to the first support bar and a second torque lever attached to the second support bar;

a first link connected to the first support bar by way of the first torque lever and a second link connected to the second support bar by way of the second torque lever, wherein the first link includes a first elongated slot and the second link includes a second elongated slot at least partially overlapping with the first elongated slot;

a first cam received by the first elongated slot and a second cam received by the second elongated slot, the first cam and the second cam being rotatable as a unit about a rotational axis, wherein the rotational axis is eccentrically arranged relative to the first cam and relative to the second cam and passes through both the first elongated slot and the second elongated slot; and an actuating lever operably connected to the first cam and the second cam, the actuating lever being manually movable by the operator to rotate the first cam and the second cam about the rotational axis;

wherein the actuating lever is movable such that the first link and the second link are retracted relative to one another to simultaneously rotate the first and second support bars in first opposite rotational directions about the respective longitudinal axes of the first and second support bars; and wherein the actuating lever is movable such that the first link and the second link are extended relative to one another to simultaneously counter-rotate the first and second support bars in second opposite rotational directions about the respective longitudinal axes of the first and second support bars.

2. The rail car door assembly according to claim 1, further comprising an actuating shaft connected to the actuating lever and fixed to the first cam and to the second cam, wherein the actuating shaft has a central axis coinciding with the rotational axis;

wherein the actuating shaft is rotatable about the rotational axis to a retraction rotational position whereby the first link and the second link are retracted relative to one another; and wherein the actuating shaft is rotatable about the rotational axis to an extension rotational position whereby the first link and the second link are extended relative to one another.

3. The rail car door assembly according to claim 2, wherein the actuating lever is directly attached to the actuating shaft.

4. The rail car door assembly according to claim 1, further comprising a gear train, wherein the actuating lever is connected to the first cam and the second cam by way of the gear train, wherein the gear train is configured to reduce an operating torque needed by the operator to move the actuating lever.

5. The rail car door assembly according to claim 4, wherein the gear train includes a drive gear coupled to the actuating lever for rotation with the actuating lever, and a driven gear meshed with the drive gear to rotate in response to rotation of the drive gear, wherein the first cam and the second cam are coupled to the driven gear to rotate with the driven gear.

6. The rail car door assembly according to claim 1, wherein the operating mechanism includes a first connecting rod pivotally coupled at one end thereof to the first torque lever and pivotally coupled at another end thereof to the first link, and a second connecting rod pivotally coupled at one end thereof to the second torque lever and pivotally coupled at another end thereof to the second link.

7. The rail car door assembly according to claim 6, wherein the first link includes a pair of clevis ears at a distal end of the first link, the pair of clevis ears of the first link having a pair of axially aligned openings for use in pivotally connecting the first link to the first connecting rod, and wherein the second link includes a pair of clevis ears at a distal end of the second link, the pair of clevis ears of the second link having a pair of axially aligned openings for use in pivotally connecting the second link to the second connecting rod.

8. The rail car door assembly according to claim 1, wherein each of the first and second cams is circular in shape.

9. The rail car door assembly according to claim 1, wherein the first link and the second link are identical.

10. A rail car comprising:

a rail car door;

an upper rail and a lower rail each extending in a longitudinal direction of the rail car;

a first support bar and a second support bar extending parallel to the first support bar, the first and second support bars each having a respective longitudinal axis, the rail car door being mounted to the first and second support bars;

a pair of upper roller assemblies engaging the upper rail for travel along the upper rail, each of the pair of upper roller assemblies including an upper crank, wherein an upper end of the first support bar and an upper end of the second support bar are respectively fixed to the upper cranks of the pair of upper roller assemblies;

a pair of lower roller assemblies engaging the lower rail for travel along the lower rail, each of the pair of lower roller assemblies including a lower crank, wherein a lower end of the first support bar and a lower end of the second support bar are respectively fixed to the lower cranks of the pair of lower roller assemblies;

wherein the first support bar is rotatable about the longitudinal axis of the first support bar relative to the rail car door to operate the upper and lower cranks fixed to the first support bar and the second support bar is rotatable about the longitudinal axis of the second support bar relative to the rail car door to operate the upper and lower cranks fixed to the second support bar, and wherein rotation of the first and second support bars about the respective longitudinal axes displaces the rail car door between a closed position and an open position; and an operating mechanism usable by an operator to simultaneously rotate the first and second support bars about the respective longitudinal axes of the first and second support bars, wherein the operating mechanism includes:

a first torque lever attached to the first support bar and a second torque lever attached to the second support bar;

a first link connected to the first support bar by way of the first torque lever and a second link connected to the second support bar by way of the second torque lever, wherein the first link includes a first elongated slot and the second link includes a second elongated slot at least partially overlapping with the first elongated slot;

a first cam received by the first elongated slot and a second cam received by the second elongated slot, the first cam and the second cam being rotatable as a unit about a rotational axis, wherein the rotational axis is eccentrically arranged relative to the first cam and relative to the second cam and passes through both the first elongated slot and the second elongated slot; and an actuating lever operably connected to the first cam and the second cam, the actuating lever being manually movable by the operator to rotate the first cam and the second cam about the rotational axis;

wherein the actuating lever is movable such that the first link and the second link are retracted relative to one another to simultaneously rotate the first and second support bars in first opposite rotational directions about the respective longitudinal axes of the first and second support bars; and wherein the actuating lever is movable such that the first link and the second link are extended relative to one another to simultaneously counter-rotate the first and second support bars in second opposite rotational directions about the respective longitudinal axes of the first and second support bars.

11. The rail car according to claim 10, further comprising an actuating shaft connected to the actuating lever and fixed to the first cam and to the second cam, wherein the actuating shaft has a central axis coinciding with the rotational axis;

wherein the actuating shaft is rotatable about the rotational axis to a retraction rotational position whereby the first link and the second link are retracted relative to one another; and wherein the actuating shaft is rotatable about the rotational axis to an extension rotational position whereby the first link and the second link are extended relative to one another.

12. The rail car according to claim 11, wherein the actuating lever is directly attached to the actuating shaft.

13. The rail car according to claim 10, further comprising a gear train, wherein the actuating lever is connected to the first cam and the second cam by way of the gear train, wherein the gear train is configured to reduce an operating torque needed by the operator to move the actuating lever.

14. The rail car according to claim 13, wherein the gear train includes a drive gear coupled to the actuating lever for rotation with the actuating lever, and a driven gear meshed with the drive gear to rotate in response to rotation of the drive gear, wherein the first cam and the second cam are coupled to the driven gear to rotate with the driven gear.

15. The rail car according to claim 10, wherein the operating mechanism includes a first connecting rod pivotally coupled at one end thereof to the first torque lever and pivotally coupled at another end thereof to the first link, and a second connecting rod pivotally coupled at one end thereof to the second torque lever and pivotally coupled at another end thereof to the second link.

16. The rail car according to claim 15, wherein the first link includes a pair of clevis ears at a distal end of the first link, the pair of clevis ears of the first link having a pair of axially aligned openings for use in pivotally connecting the first link to the first connecting rod, and wherein the second link includes a pair of clevis ears at a distal end of the second link, the pair of clevis ears of the second link having a pair of axially aligned openings for use in pivotally connecting the second link to the second connecting rod.

17. The rail car according to claim 10, wherein each of the first and second cams is circular in shape.

18. The rail car according to claim 10, wherein the first link and the second link are identical.

* * * * *